Nov. 6, 1962

N. B. BLAKE ETAL
SEISMIC RECORDING AND REPRODUCING
METHODS, APPARATUS AND RECORDS 3,063,053

Filed March 29, 1957

INVENTORS
NORMAN B. BLAKE &
WILLIAM E. HOLTKAMP, Jr.
BY

ATTORNEYS

Nov. 6, 1962    N. B. BLAKE ETAL    3,063,053
SEISMIC RECORDING AND REPRODUCING
METHODS, APPARATUS AND RECORDS
Filed March 29, 1957
2 Sheets-Sheet 2
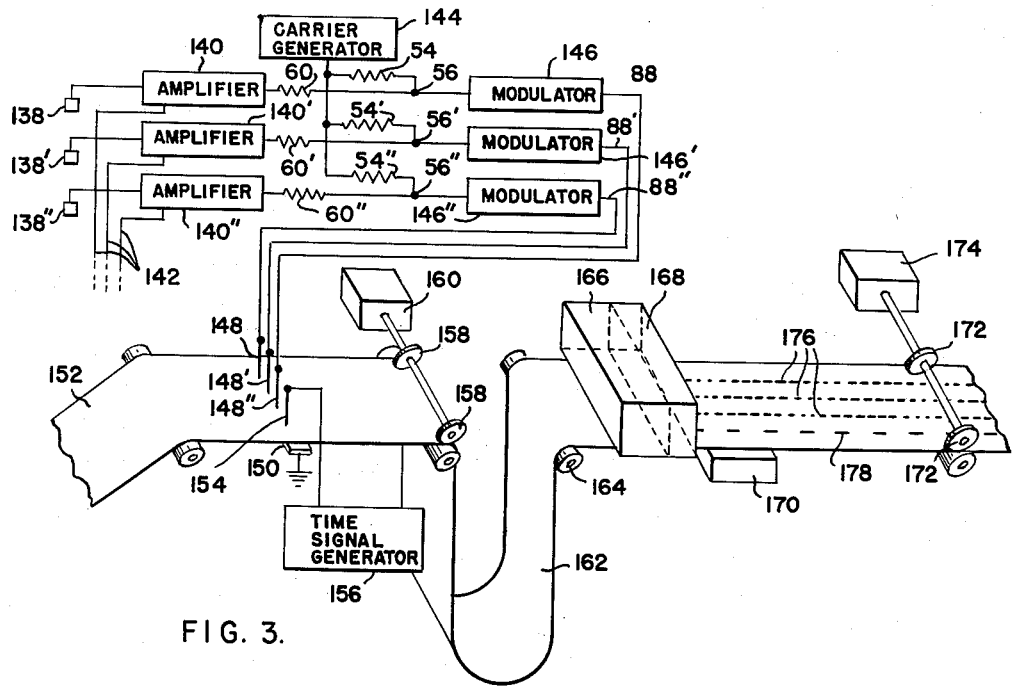
FIG. 3.
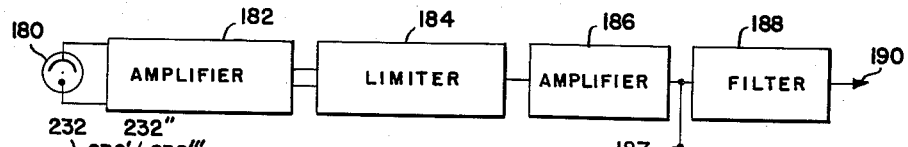
FIG. 4.
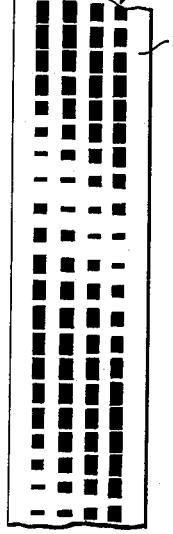
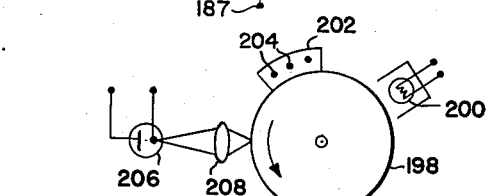
FIG. 6.
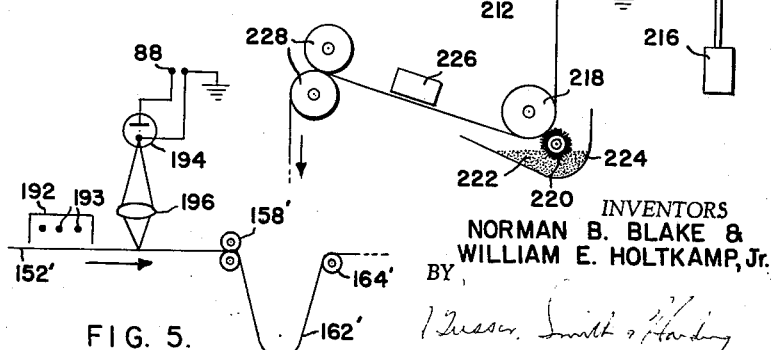
FIG. 7.    FIG. 5.
INVENTORS
NORMAN B. BLAKE &
WILLIAM E. HOLTKAMP, Jr.
BY
ATTORNEYS

United States Patent Office 3,063,053
Patented Nov. 6, 1962

3,063,053
SEISMIC RECORDING AND REPRODUCING
METHODS, APPARATUS AND RECORDS
Norman B. Blake and William E. Holtkamp, Jr., Beaumont, Tex., assignors to Sun Oil Company, Philadelphia, Pa., a corporation of New Jersey
Filed Mar. 29, 1957, Ser. No. 649,485
12 Claims. (Cl. 346—74)

This invention relates to seismic recording and reproducing methods and apparatus and records produced thereby and has particular reference to the production of visual records of pulse width modulated carriers.

In older seismic techniques, signals picked up by detectors were subjected to filtering, time delays and other operations and then directly recorded as visible wave traces through the use of oscillographs. Such techniques did not lend themselves to alternative treatments of the seismic signals without the actual firing of new shots for each variation desired. Accordingly, more recently an improved practice has been adopted in which, in the field, the signals from seismic detectors have been recorded on magnetic tapes, usually using the technique of frequency modulating with the seismic signal carriers having frequencies substantially exceeding any frequency components of interest in the seismic signals. The magnetic tape records thus made may then be taken to a laboratory for any number of reproductions during each of which the signals may be subjected to desired filtering, delays, adjustments, comparisons, or the like. Inasmuch as seismic work is quite expensive to carry out, it has been the usual practice, to insure that the magnetic record was being properly made, to read out from the record, concurrently with recording, signals which were used to record visually through an oscillograph. Even then operating delays were involved since the usual oscillograph record had to be developed photographically for examination.

It is the general object of the present invention to provide novel recording and reproducing techniques which may be variously used in connection with seismographic work. So-called electrophotographic techniques may be used, though in accordance with a preferred embodiment of the invention the use of light is not involved but an electrosensitive surface is used with methods of developing and fixing in accordance with electrophotographic practices. Alternatively, recording may be effected by the use of electrosensitive materials which give visible records through the passage of currents; or by the use of pressure or heat sensitive materials.

Preferably, in accordance with the invention, visual recording of pulse width modulated carriers is involved though, as will appear, the invention also encompasses means for magnetic recording of pulse width modulated carriers. Upon close examination a visual record is in the form of a succession of dots or dashes of varying lengths provided at a constant frequency with the result that when the record is viewed from a suitable distance a single trace will appear as a line of varying density. If a number of related traces are located side by side, the resulting composite record may be read and interpreted by those who have become familiar with the technique, with the interpretation being essentially as informative as that secured by the use of the conventional oscillograph wave traces. The record, furthermore, is reproducible either to give rise to seismic waves corresponding to the original signal, or to produce oscillograph records, magnetic records, photographic variable density records, or electrophotographic records. In the reproducing procedure the recovered seismic waves may be subjected to filtering, delays or other conventional techniques.

As will more fully appear from the detailed description which follows, the procedure in accordance with the invention may be utilized in various ways. It may, for example, constitute the sole record which is produced in the field, there being various advantages involved in the way of high linearity, less critical dependence upon speed of the recording tape, substantially immediate visibility without the necessity for chemical photographic development, and other advantages which will appear hereafter. The original record may be reproduced in the laboratory with all the advantages of the reproduction of conventional magnetic records and with additional advantages having to do with the utilization of pulse width modulation.

Alternatively, the improved techniques may be applied to the monitoring of magnetic records.

The foregoing general objects of the invention as well as other objects relating to details of construction, operation, techniques and resulting records, will become apparent from the following description, read in conjunction with the accompanying drawings, in which:

FIGURE 3 is a diagram illustrating a system for the production of visual records of seismic signals;

FIGURE 4 is a diagram illustrating the apparatus involved in the reproduction of the type of record provided in accordance with FIGURE 3;

FIGURE 5 is a fragmentary diagram showing an alternative recording procedure;

FIGURE 6 is a diagram illustrating still another recording system which involves electrostatic printing; and FIGURE 7 is a diagram illustrating in conventionalized form a portion of a record produced in accordance with the invention.

Figure 1:
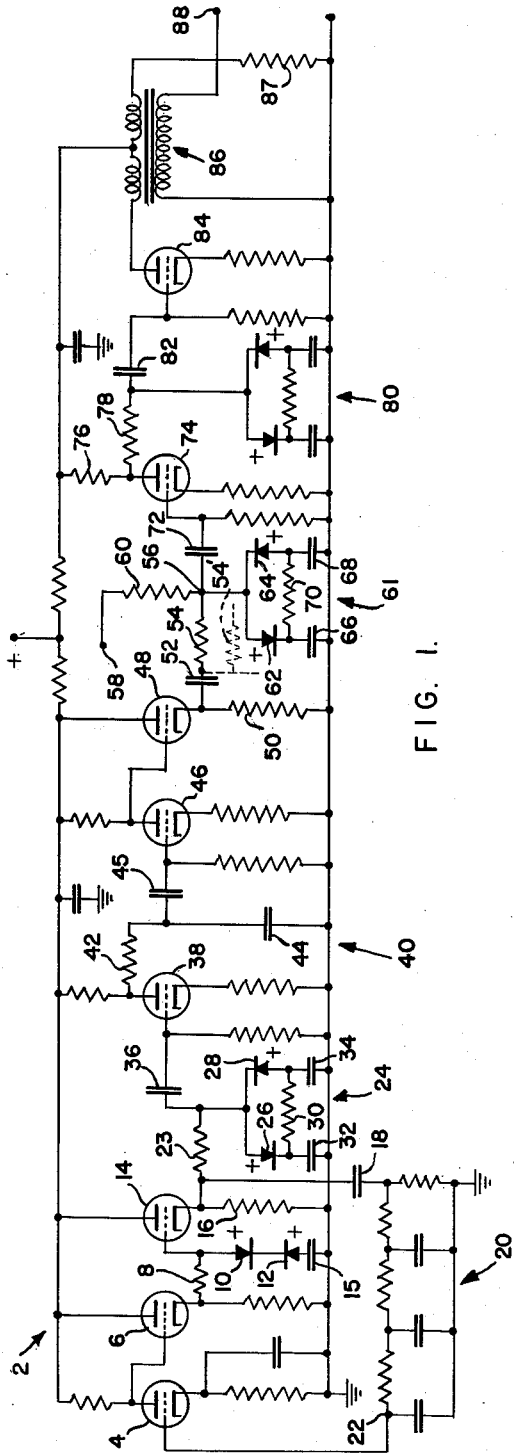
FIGURE 1 is a wiring diagram showing, in particular, circuitry involved in converting a seismic signal to an output signal consisting of a pulse width modulated carrier.

Before proceeding with a discussion of the various overall techniques involved in accordance with the present invention, there will first be described, with reference to FIGURE 1, a circuit which may be variously used for the production from seismic signals, either original or reproduced, of pulse width modulated carriers. As will appear hereafter, this circuit may be used in various ways in the techniques provided by the invention.

There is indicated generally at 2 an oscillator, which is claimed in our application, Serial Number 649,489, filed March 29, 1957, now Patent No. 2,941,160, issued June 14, 1960, and which is particularly advantageous in the production of a carrier which may typically have a frequency of 600 cycles per second in seismic work. This frequency is by no means critical and may be widely varied depending upon the results desired. The oscillator comprises a triode 4 associated with an anode load resistor and providing an amplified output through a direct conductive connection to the grid of triode 6 connected in a cathode follower arrangement. The output from the cathode of triode 6 is delivered through a resistor 8 to an arrangement of diodes 10 and 12 arranged oppositely in series and connected through a large capacitor 15 to ground. These diodes are of a known reference type which have the property of breaking down when the reverse potential across them exceeds a definite value such as 3½ volts for each diode. The ungrounded end of this diode arrangement is connected to the control grid of triode 14 which is arranged in a cathode follower circuit with a cathode resistor 16. The output of this cathode follower is delivered through capacitor 18 to a phase shift lag line constituting a low pass filter which filters out essentially everything but a fundamental wave and accordingly provides an output from a terminal 22 to the grid of amplifier triode 4 which is substantially a pure sine wave. The frequency of oscillation is determined by that frequency which through the phase shift line 20 provides a 180° phase shift. The number of sections of the line 20 may be increased to provide additional filtering action to secure as nearly a pure sine wave output as may be desired.

The oscillator just described has considerable advantage over other oscillators for the purposes here involved. The usual phase shift oscillator is barely on the point of oscillation whereas the present oscillator may have violent oscillations with maintenance of a substantially constant output and feed back irrespective of the gain of the amplifier stage involving triode 4. This results from the fact that the diodes 10 and 12 limit the peak-to-peak signal appearing at the grid of the cathode follower triode 14. For example, if each of the diodes 10 and 12 breaks down at 3½ volts, the peak-to-peak amplitude at the grid of triode 14 will be approximately seven volts irrespective of the gain of the amplifier. The capacitor 15, of course, acquires a positive potential, due to the D.C. connection between the anode of triode 4 to the grid of triode 6, on which positive potential the alternating signal is superposed. A substantially pure sine wave input to the triode 4 gives a sine wave output therefrom, with small distortion, greatly in excess of the peak-to-peak signal appearing at triode 14. The result is that at the cathode of triode 14 there appears (superposed on a constant D.C. base) a square wave of substantially constant amplitude differing from an exact square wave by being somewhat rounded. The feed-back through the line 20 removes from this square wave its harmonic components to deliver a substantially pure fundamental sine wave to the tube 4. Substantially constant frequency is maintained since the oscillations occur at that frequency which has a 180° phase shift through the passive network 20. If adjustability of frequency is desired, the resistors and capacitors of the network may be made variable. Conventional network theory gives the resistance and capacity relationships which for a given frequency results in the 180° phase shift and optimum filter action, and hence that need not be detailed herein.

The output from the cathode of triode 14 is delivered through resistor 23 (e.g. having a value of 500,000 ohms) to a limiter indicated generally at 24. This limiter comprises the oppositely arranged diodes 26 and 28 connected to the output end of resistor 23 and through respective capacitors 32 and 34, each of large capacity, for example 0.47 microfarad, to ground. The ungrounded ends of the capacitors are connected through a resistor 30 which may typically have a resistance of 50,000 ohms. This limiter has a self-balancing action providing at the output end of resistor 23 a good square wave in the sense that its corners are much sharpened as compared with the wave at the cathode of triode 14. The self-balancing action may be described as follows:

In the usual limiter, batteries would be provided at 32 and 34 to bias the diodes to prevent conduction until the input to each exceeded the bias voltage. In the present instance, the capacitors become charged, 32 positively and 34 negatively (both with respect to a positive base potential corresponding to the mean positive potential of the cathode of triode 14), with the high value resistor 30 tending to effect their mutual discharge. A tendency for either towards an increased potential relative to the base potential results in a greater current flow through resistor 30 and the result is that for a given constant amplitude and frequency of the approximately square wave input at the cathode of triode 14, they have substantially constant potentials at the times of pulse rises. The result is a balanced output due to resistor 30 within which lies the base potential. The resistor 30 thus self-balances the limiter to a substantial degree irrespective of differences in characteristics of the diodes 26 and 28 and with avoidance of the necessity of independently balancing to center the conventionally used batteries.

The resulting square wave is delivered through capacitor 36 to the grid of triode 38 arranged in an amplifying circuit the output of which is delivered to an integrator, generally designated 40, and comprising the resistor 42 and the capacitor 44, the latter being connected to ground. While a more elaborate form of integrator might be used, for the purposes here involved the simple resistance-capacitance integrator illustrated is ample. The integration provides an isosceles triangular wave which is delivered through the capacitor 45 to the grid of a triode 46 arranged in a conventional amplifier circuit and providing its output to the grid of a triode 48 in a cathode follower circuit including the cathode resistor 50. The amplified triangular wave is delivered through capacitor 52 to one or more resistors 54 extending to one or more terminals 56.

The triangular wave generator constituted by the portion of FIGURE 1 to the left of the output terminal of capacitor 52 may suffice to provide carriers for a number of channels involved in seismic recording. For example, it is common to have a large number of these channels, a typical number being 24 individual to seismic detectors, a typical number being 24 channels. To the right of capacitor 52, accordingly, there is indicated the circuitry involved in the matter of a single channel, the connections providing triangular wave inputs to similar circuits for other channels being indicated at 54'.

Considering, now, a single channel, the terminal 56 has a second input through resistor 60 from a terminal 58 receiving from an individual channel amplifier an amplified signal from a single seismic detector. Referring to the seismic signal as the modulating signal, this modulating signal and the triangular carrier delivered to the terminal 56 are clipped by the limiter indicated generally at 61 which has a construction similar to the limiter previously described at 24, consisting of the oppositely disposed diodes 62 and 64 connected to the terminal 56, individually connected to ground through the capacitors 66 and 68, and interconnected by the resistor 70. The action of the limiter 61 is to clip variously the peaks of the triangular carrier waves which are, in effect, caused to vary upwardly and downwardly in accordance with the modulating signal. The result is an output through capacitor 72 to the grid of amplifier triode 74 of an essentially constant frequency somewhat trapezoidal wave in which the tops and bottoms of the individual waves vary in width depending upon the modulation. The resulting wave is amplified in the amplifying circuit comprising the triode 74 and its anode load resistor 76 and delivered through a resistor 78 to a second limiter 80 which has the same construction as liimter 61. In this limiter further clipping takes place with the result that through capacitor 82 there is delivered to the grid of triode 84 a wave which is essentially rectangular consisting of pulses the widths of which vary so that the output is a pulse width modulated carrier, the pulse widths corresponding to the amplitude of the modulating seismic signal. The relationship of pulse width to modulating signal amplitude is, furthermore, linear due to the clipping of a triangular wave. The triode 84 is arranged in an amplifying circuit including the primary of a transformer 86 and the dummy load constituted by the resistor 87. The secondary of the transformer 86 provides the output to a terminal 88. The secondary may be so chosen as to give either a low or high impedance output depending upon what is desired. If, for example, there is to be produced a pulse width modulated signal on a channel of a magnetic tape or a record on a current sensitive record member, or a record by exertion of pressure on a pressure-sensitive record member, a low impedance output is desired. On the other hand, a high impedance output may be provided to drive a glow tube or an electrode of an electrosensitive recorder. The high impedance output may, of course, also be taken from the anode of triode 84. Under some circumstances it may be desirable to provide several outputs for simultaneous magnetic tape recording and recording on an electrosensitive member as will be described particularly hereafter.

There will now be described with reference to FIGURE 2 a reproducing circuit which may receive a signal derived from a pulse width modulated carrier to deliver the original variable amplitude seismic wave which produced such record or to redeliver a pulse width modulated carrier in a rerecording procedure. The input is provided at the terminals 90 of a transformer 91. If the input is from a magnetic record of a pulse width modulated carrier, the input will actually consist of the first time derivative of the actual record. In other words, for each pulse of the record there will be produced a pair of peaks, one positive and one negative, corresponding to the beginning and end of each pulse. (A similar input may be provided, if desired, by differentiating the photoelectric signal produced from a visual pulse width modulated carrier record, though this is not generally necessary or desirable.)

Assuming the input to be of the type just mentioned, consisting of sharp, positive and negative peaks, the signal is successively amplified in the conventional stages comprising first the pair of triodes 92 and 94 and second the pair of triodes 96 and 98, so that amplified signals are provided through the capacitors 100 and 102. The signals thus provided are fed to the diodes 104 and 106 which are similarly disposed and associated with a resistance array as shown in FIGURE 2. The diodes are respectively connected to the grids of triodes 108 and 110, the grids and anodes of which are cross-connected through resistors 112 and 114 to provide a conventional bistable multivibrator or flip-flop which may be triggered by the negative peaks delivered through the diodes. (It will be noted that the originally mentioned positive and negative peaks at the input terminals 90 will produce respective negative peaks appearing at the respective grids of the triodes 108 and 110.)

The resulting output from the multivibrator delivered through capacitor 116 is, accordingly, a rectangular wave, the positive excursions of which, for example, correspond in duration to the lengths of the pulses of the original modulated carrier, while the negative excursions of which correspond in duration to the lengths of the intervals between such pulses. The amplitude of the rectangular wave delivered through capacitor 116 will not ordinarily be constant, and accordingly it is delivered through resistor 118 to the limiter 120 which may be similar to limiters 24 and 61 previously discussed. As a result there is delivered to the grid of triode 122 a substantially constant amplitude rectangular wave or, viewed otherwise, a series of rectangular pulses corresponding to those of the record being reproduced.

It may be here noted that the network consisting of capacitors 100 and 102, diodes 104 and 106, and the interconnecting resistors effects balancing of the system so that the multivibrator triggers at a certain percentage of the peak value of the input pulses rather than at absolute voltage levels.

The triode 122 is in a cathode follower circuit including the cathode resistors 124 and 126 arranged in series. From the cathode there may be delivered to terminal 128 the rectangular wave, or series of pulses, for rerecording either on a magnetic tape or, with amplification, by one of the methods hereafter described. However, if it is desired to recover the original seismic modulating signal, the cathode of triode 122 is connected through resistor 130 to the low pass filter 132 designed to pass only the modulating signal. The output of this filter is delivered to the grid of triode 134 to provide an output between the terminals 136, which output will be essentially the modulating wave.

If a visual pulse width modulated carrier record is photoelectrically read, differentiation is unnecessary; instead, the photoelectric signal is amplified and limited, as by limiter 120, and the output is provided as at 128 for rerecording or filtered to recover, as at 136, the modulating wave.

Figure 2:
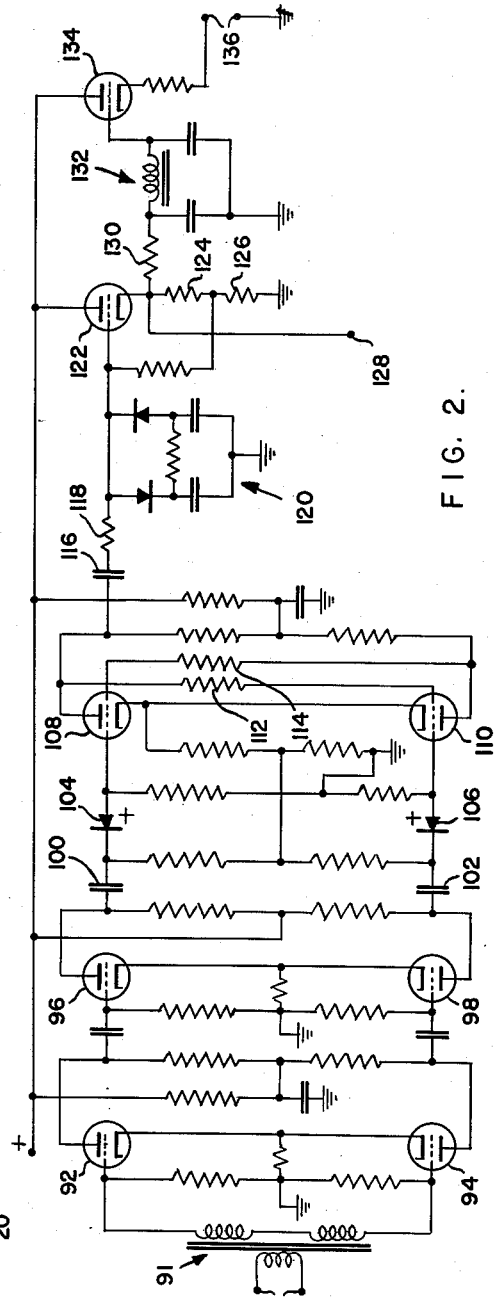
FIGURE 2 is a wiring diagram showing a preferred form of circuitry involved in receiving a pulse width modulated carrier after differentiation and converting it into a variable amplitude signal.

It may here be noted that the system in FIGURE 2 provides its results substantially independently of tape speed changes, which is unlike the results from frequency modulation of a recording tape wherein tape speed changes effect additional frequency modulation to give rise to spurious results.

Reference may now be made to the methods and apparatus desirably employed to produce visual records of a pulse width modulated carrier. Desirably utilized is printing by means of heat development of an electrosensitive material. For a clear understanding of the matters involved in such a procedure reference may be made to the "Electrofax" printing system which is described in an article by C. J. Young and H. G. Greig in the December 1954 issue of "R.C.A. Review," vol. XV, No. 4. Further reference as to details of materials used, their characteristics, and techniques involving them, may be made to the following patents:

Carlson, 2,221,776, November 19, 1940
Carlson, 2,297,691, October 6, 1942
Thomsen, 2,727,807, December 20, 1955
Thomsen, 2,727,808, December 20, 1955
Greig, 2,727,826, December 20, 1955
Greig, 2,730,023, January 10, 1956
Young et al., 2,732,775, January 31, 1956
Greig et al., 2,735,784, February 21, 1956
Greig, 2,735,785, February 21, 1956

As is pointed out in these references, sheets coated with an insulating resin in which zinc oxide or other photoelectric material is embodied may be electrostatically charged and then over selective areas discharged by the action of light to leave photostatic latent images which are then dusted with fine pigmented particles, with final fixing by means of heat which softens the resin and thereby permanently binds the pigmented particles in the areas to which they initially adhered by electrostatic action. While these references relate to the use of light for differentiating the areas of the image, it is possible, using similar materials, to provide latent electrostatic traces on a tape or the like by selective electrostatic charging, this being followed, as in the case of photographic processes by development with pigmented dust particles and fixing by the use of heat. In case light is not involved, it is not necessary to have imbedded in the resin coating photoelectric material. In the description which follows the details of developing and fixing techniques will not be particularized since these may be in accord with the disclosures of the article and patents referred to above.

Reference may now be made to FIGURE 3 which diagrams apparatus desirably used for carrying out the objectives of the present invention. Indicated in FIGURE 3 are only three seismic channels, though it will be understood that in accordance with usual practice there may be a large number involved, each corresponding to the signals picked up by a detector as the result of firing a single shot or otherwise providing a seismic wave source in the earth. Three typical seismic detectors are indicated at 138, 138' and 138". The usual variable amplitude waves from these are amplified by individual amplifiers 140, 140' and 140" for delivery to the type of apparatus shown in FIGURE 1 and heretofore described. If the invention is applied to the monitoring of simultaneously produced magnetic records, outputs may be taken at 142 from the several amplifiers to provide magnetic recording of the individual channels. For monitoring, however, it may be more desirable to effect magnetic recording and then pick up from the magnetically recorded channels outputs which are in turn amplified for delivery to the apparatus shown in FIGURE 1, this procedure insuring that if the final visual records appear and are satisfactory then magnetic records of satisfactory nature have been produced.

Outputs from the amplifiers 140, 140' and 140" are illustrated as delivered to resistors 60, 60' and 60" and thence to terminals 56, 56' and 56", the resistors and terminals corresponding to those similarly designated in FIGURE 1. There is diagrammed at 144 a carrier generator which consists of the oscillator and triangular wave forming elements of FIGURE 1, the carrier being delivered to the terminals 56, 56' and 56" through resistors 54, 54' and 54". Each of the modulators 146, 146' and 146" corresponds to the portion of FIGURE 1 following the terminals 56 therein, and the output terminals at 88, 88' and 88" correspond to the output terminal 88. In the case of the embodiment of the invention shown specifically in FIGURE 3, a high voltage, high impedance output is desired.

The output terminals are connected individually to electrodes 148, 148' and 148", the lower chisel-shaped edges of which extend across and engage the upper surface of a sheet 152 in a region where it is backed by a grounded conductive plate 150. The sheet 152 is of paper coated on its upper surface with a resin of the type described in the references give above. It may or may not contain zinc oxide or other photoelectric material, though if the latter is used in the present instance the recording and handling of the sheet up to the point of fixing must occur in the dark.

A further electrode 154 similar to 148 is provided to record a time signal from a generator 156, the output voltage at the electrode being sufficiently high to provide the electrostatic latent image.

During recording the sheet 152, running from a suitable supply, may have a higher linear speed than is desirable for the development and fixing. Consequently, it is arranged to be advanced at a suitable recording speed past the electrodes 148, 148', 148" and 154 by means of rollers 158 driven by a motor arrangement 160, provision being made through the use of an idler roller 164 for the formation of a loop 162. Either simultaneously with recording or following recording the sheet is then progressed past a box 166 in which there may be located any desirable developing arrangement capable of applying particles to the charged area of the sheet. This may be a box in which a dust of pigmented particles is provided, in which case it is desirably followed by a chamber 168 at which excess particles may be blown from the sheet and removed by an evacuating device. On the other hand, if a magnetic brush is used such as is described in the article above, this would not be necessary. After the dust particles adhere to the charged areas of the sheet, the sheet passes over a heater 170 whereby the resin on its surface is softened to entrap the particles. The advance of the sheet is effected through the use of rollers 172 driven by a motor arrangement 174 which may effect drive at a speed slower than the drive effected by the rollers 158.

As a result of the operation, the particles are adhered to the sheet along lines 176 at areas corresponding in length to the recorded pulses and in width to the chisel-shaped edges of the electrodes. Similarly, at 178 a visible record is produced of the timing markings, which may be in the form of dots or dashes. More detailed reference will be made hereafter to the nature of the visual records produced at 176.

The operation is as follows:

The electrodes receive high voltage pulses and by reason of contact with the non-conductive resinous coating on the sheet produce electrostatic charges thereon which will, in general, be negative, the plate 150 discharging the other side of the sheet so that the charges are held as minute condenser charges. The dust may be either positively or negatively charged by triboelectric effect. If positively charged the dust particles will adhere to the negatively charged areas on the sheet. If they are negatively charged they will be there repelled but will adhere to the nonnegatively charged areas of the sheet. Thus positive or negative images of the pulses may be produced.

Not only has the record the advantage of almost immediate visibility so that it may be examined, but it is also reproducible photoelectrically. The photoelectric reproducion may be for several purposes. It may be merely to provide another similar record with the traces displaced lengthwise of the record to take into account step out and weathering corrections in the usual fashion for better interpretability of the record. More usually, however, the reproduction would be for the purpose of recovering the original seismic wave for the purpose of applying to it filtering, delay, or the like, or for the purpose of combining it with other seismic waves in fashions which are well known in the art. The ultimate recording of the output of this procedure may be through the use of a conventional oscillograph, by magnetic recording, or by rerecording utilizing the electrosensitive system herein described. In the latter case, the recovered seismic signal would be refed into one or more of the channels of the apparatus shown in FIGURE 3, the input replacing the detectors at 138.

FIGURE 4 illustrates diagrammatically a typical photoelectric reproducing system. This is shown for a single channel only, though it will be understood that usually all of the channels or selected ones thereof would be read simultaneously.

A photocell pickup is indicated at 180. The output of this is amplified by amplifier 182 and fed to a limiter 184, such as 120 of FIGURE 2. The signal may then be fed to a further amplifier 186, which, however, may well involve only impedance transformation as by a cathode follower. If rerecording is then to be effected, an output may be taken at terminal 187 to be applied (possibly through an amplifier) to electrodes such as 148, the electrodes possibly in this case being adjusted lengthwise of the record sheet so as to secure desired relative displacement of the channels. On the other hand, if modification of the records is desirable by filtering, delay, or the like, the output from 186 may be fed to a filter 188 for recovery of the seismic signal at 190 and, possibly, to a delay line and/or seismic filter, with an ultimate output of the recovered or modified seismic signal. Here it may be combined with signals from other channels and rerecorded in one of the fashions already mentioned, being fed, for example, to the input of an amplifier 140 (FIGURE 3). Magnetic recording of either the pulse width modulated carrier or of the recovered seismic signal, directly or as a frequency modulated carrier, may, of course, be effected.

The foregoing indicates general techniques which may be used in accordance with the invention and the various combinations of elements which may be utilized for particular purposes. However, other techniques may also be involved and one of these involving electrophotographic action will now be described with reference to FIGURE 5.

In this figure certain parts and elements corresponding to those in FIGURE 3 are designated by the same reference numerals primed, it being understood that to the right of roller 164' the apparatus may be the same as to the right of roller 164 shown in FIGURE 3. In FIGURE 5 the sheet 152' is of the photosensitive type described in the reference above, i.e., it is coated with a resin containing a photoelectric material such as zinc oxide. In this procedure the coated surface of the paper is first sensitized by receiving an overall negative charge through the use of an apparatus indicated at 192 containing electrodes 193 which are supplied with a voltage sufficiently high to cause corona discharge. Recording of a latent image is then effected by focusing by means of a lens 196 on the sheet a minute image of a glowing electrode of a glow lamp 194 which is operated from the output terminal 88 of a circuit such as that in FIGURE 1. One glow lamp is provided for each of the channels on the sheet 152' including that for timing markings. By this action discharge is effected selectively in accordance with the pulses, discharging the negative charge on the coating in those areas corresponding to the pulses. Thereafter the development and fixing is as described in connection with FIGURE 3, either a positive or negative image being produced depending upon the charge of the developing powder.

It may be noted that a glow lamp such as 194 operating from an output terminal 88 may produce pulse width modulated records on ordinary photographic paper developed chemically, and this mode of producing visible pulse width modulated records is within the scope of the present invention.

FIGURE 6 illustrates a further technique which involves "printing" by direct transfer of the electrostatic latent image. The advantage of this is that the relatively expensive and carefully prepared coated paper is not utilized to provide the final visual record. In accordance with what is illustrated in FIGURE 6, a drum 198 is provided arranged to be rotated to secure proper recording of a latent image thereon. About the drum there are disposed various elements. At 200 there is shown a lamp of sufficient intensity to discharge the latent image from the surface of the drum 198 when this surface is coated with an electrophotographic sensitive material such as zinc oxide-resin mixture. In an enclosure 202 there are corona-producing electrodes 204 arranged to provide a uniform negative charging of the surface of the drum. At 206 there is indicated one of a series of glow lamps similar to 194 previously described, each being associated with a lens system 208 for projecting on the drum surface a minute image of the glowing electrode of the lamp. Instead of utilizing the corona charging arrangement and the glow lamp arrangement for providing the traces on the drum, the latent electrostatic image may be produced on the drum utilizing electrodes such as 148. However, for purposes of erasure, it would nevertheless be desirable to have the drum coated with an electrophotographic sensitive material so that erasure can be effected by the use of a lamp such as 200. However, erasure may be effected if desired by an electrostatic discharging in which case the surface of the drum need not be of electrophotographic type, but it may carry only an insulating coating.

A sheet 210 of relatively inexpensive paper having on its upper surface an insulating resin coating, not necessarily of special type, passes over a roller 212 which is carried by a lever 214 arranged to be rocked in a clockwise direction by a solenoid 216 when the transfer of the electrostatic latent image is to occur. From the roller 212 the paper passes about a roller 218 at the location of which it is arranged to be wiped by a magnetic-iron filing brush 220 which picks up pigmented particles 222 from a container 224. This magnetic brush may be of the type described in the article referred to above, the brush consisting of a permanent magnet while the mixture at 222 consists of iron particles and pigmented particles, the iron particles taking on negative charges and the toner particles positive charges by triboelectric effect when they are mixed. Beyond this there is the heater 226 for softening the resin and trapping the pigmented particles where they adhere to the negatively charged areas. Draw off rollers 228 serve to advance the sheet 210 at a rate proper for the developing and fixing action.

Operation is as follows:

With the sheet 210 dropped out of contact with the drum 198 by deenergization of the solenoid 216, the drum 198 is rotated by its drive means, not shown, with the lamp 200 turned on to erase any electrostatic images which appear thereon. The electrodes 204 are energized to impart to the surface 198 a uniform negative charge. It is then rotated at a suitable speed while the glow lamps 206 are energized by the pulse outputs from circuits of the type shown in FIGURE 1.

The solenoid 216 is energized and the draw off rollers 228 caused to advance the sheet 210 and concurrently rotate the drum, so that the charge on the drum is, in effect, transferred to the sheet 210. By the action of brush 220 (or other means as indicated above) pigmented particles are then caused to adhere to the charged (or uncharged) areas of the sheet and fixed by the application of heat. Similar operations are involved if the recording on the drum is effected by electrodes. Timing markings, are, of course, also applied. It may be noted that the electrostatic image may be applied to the drum and transferred therefrom in a single operation, erasure being progressively effected from the drum by lamp 200; or, alternatively, the image may be applied to the drum in one operation and then in a subsequent slower operation the image may be transferred to sheet 210. In the latter case a complete record would occupy somewhat less than the drum circumference, lamp 200 and charging drum 202 being deenergized during recording.

Visual recording in the form of pulse width modulated records has so far been described as accomplished (a) by electrostatic charging or discharging of a record member with physical development by pigmented dust, (b) by utilizing light to provide an electrostatic record similarly physically developed, and (c) by conventional photographic recording procedure involving chemical development. Other procedures also usable include: (d) the use of current sensitive paper or other recording base, (e) the use of pressure sensitive record members, and (f) the use of heat sensitive record members. Each of the last three procedures is well known for the automatic tracing of curves or reproduction of printed material, or the like.

The "Alfax" process is an example of the procedure (d). Here a visible record is produced by flow of current through a sensitized paper moving past an electrode in engagement with its surface, the paper being backed by a conductor constituting a second electrode. For this type of recording, apparatus essentially similar to that illustrated in FIGURE 3 may be used except that the voltage applied to electrodes such as 148 may be relatively low derived from a suitable secondary of a transformer at 86 in FIGURE 1. Of course, no development is required. The process may also be electrolytic, the paper being moist and sensitized by a mixture of a salt such as sodium chloride and a material which changes color in the presence of an acid or alkali such as ferric ferrocyanide or an indicator. The acid or alkali released by electrolysis of the salt then produces a visible record by the change of color of the sensitive material.

In procedure (e), the pressure sensitive record member is variably engaged by a stylus electromagnetically movable, the polarized driving electromagnet being energized by current from a transformer at 86 in FIGURE 1.

In procedure (f) a heat sensitive record member is engaged by a short wire of low thermal inertia through which passes a current provided by a transformer at 86 fed through a rectifier so that only the peaks (or valleys) of the current wave will produce a record.

It may be noted that dusting a pulse width modulated magnetic recording tape with iron or other ferromagnetic power is in general not satisfactory since the powder will adhere to both positive and negative magnetic poles on the recording tape.

The type of visual record produced by any of the methods described is diagrammed in highly magnified form in FIGURE 7, wherein four seismic channels are indicated. The record sheet 230 may correspond to any one already described. The four record channels 232, 232', 232" and 232'" are located side by side. Each comprises markings occurring at equal intervals but of varying lengths. Assuming that the longest markings correspond to peaks of seismic signals and the shortest markings to troughs thereof, it will be evident that visual correlations may be made, the effect of viewing being essentially that produced by varying density photographic traces. However, from the standpoint of reproducibility, the pulse width modulated traces are highly superior to variable density (or variable width) photographic traces since the original seismic signal amplitude is linearly preserved in the form of pulse lengths with complete independence of the nonlinear relationships existing in conventional photographic-photoelectric reproduction, such as variable density-exposure relationships of films, nonlinearities in photoelectric reproduction, and the like.

What is claimed is:

1. In combination, means providing modulated electrical signals corresponding to seismic signals, means receiving said electrical signals and providing pulse width modulated carrier signals in which the modulation corresponds to said seismic signals, and means for recording the last mentioned signals, the last mentioned means comprising an electrode receiving said signals as high voltage pulses and located closely adjacent to an insulated surface to provide thereon a latent electrostatic image having variable length areas corresponding to the last mentioned signals.

2. In combination, means providing modulated electrical signals corresponding to seismic signals, means receiving said electrical signals and providing pulse width modulated carrier signals in which the modulation corresponds to said seismic signals, and means for recording the last mentioned signals, the last mentioned means comprising an electrode receiving said signals as high voltage pulses and located closely adjacent to an insulated surface to provide thereon a later electrostatic image having variable length areas corresponding to the last mentioned signals, means for applying developing powder to said electrostatic image, and means for fixing the developed image.

3. In combination, means providing modulated electrical signals corresponding to seismic signals, means receiving said electrical signals and providing pulse width modulated carrier signals in which the modulation corresponds to said seismic signals, and means for recording the last mentioned signals, the last mentioned means comprising fixed means receiving the last mentioned signals and providing on an insulated surface a latent electrostatic image, means feeding such insulated surface at relatively high speed past said fixed means, means for applying developing powder to said electrostatic image, means for fixing the developed image, and means for feeding said insulated surface at a relatively low speed past the last two mentioned means.

4. In combination, an electrode, means effecting linear relative movement between said electrode and an insulated surface, with said electrode located closely adjacent to said surface and being fixed against transverse movement relative to said linear movement, and means for applying high voltage pulse width modulated signals to said electrode to provide on said insulated surface a linear latent electrostatic image corresponding to said signals.

5. In combination, an electrode, means effecting relative movement between said electrode and an insulated surface, with said electrode located closely adjacent to said surface, means for applying high voltage signals to said electrode to provide on said insulated surface a latent electrostatic image corresponding to said signals, means feeding said surface at a relatively high speed past said electrode, means for applying developing powder to said electrostatic image, means for fixing the developed image and means feeding said surface at a relatively low speed past said last two mentioned means.

6. In combination, a source of electrical signals, fixed means receiving said signals and for producing on an insulated surface of a sheet a latent electrostatic image corresponding to said signals, means feeding said sheet at relatively high speed past said fixed means, means for applying developing powder to said electrostatic image, means for fixing the developed image, and means for feeding said sheet at a relatively low speed past the last two mentioned means.

7. In combination, a source of pulse width modulated electrical signals, fixed means receiving said signals and for producing on an insulated surface of a sheet a latent electrostatic image corresponding to said signals, means feeding said sheet at relatively high speed past said fixed means, means for applying developing powder to said electrostatic image, means for fixing the developed image, and means for feeding said sheet at a relatively low speed past the last two mentioned means.

8. Apparatus for recording as a function of time on a record element a seismic signal in the form of an elongated constant width record composed of areas of varying length in the direction of said elongation corresponding to pulses of a pulse width modulated carrier comprising means providing modulated electrical signals corresponding to seismic signals, means receiving said electrical signals and providing pulse width modulated carrier signals in which the modulation corresponds to said seismic signals, a record element, recording means receiving the last-mentioned signals and recording them on said record element, and means producing a linear relative movement between said record element and said recording means, said recording means being fixed against transverse movement relative to said linear relative movement to provide a record solely in the direction of said relative movement.

9. Apparatus as claimed in claim 8 in which said recording means provides said record in the form of a latent electrostatic image on said record element, and includes means for applying developing powder to said electrostatic image, and means for fixing the developed image.

10. Apparatus for recording as functions of time seismic signals in the form of a plurality of elongated constant width records side by side on a record element, each of said records being composed of areas of varying length in the direction of said elongation corresponding to pulses of a pulse width modulated carrier comprising means providing modulated electrical signals individually corresponding to a plurality of seismic signals, means receiving said electrical signals and providing pulse width modulated carrier signals individual to said seismic signals and in which the modulaton corresponds to said seismic signals, a record element, a plurality of means individually receiving the last-mentioned signals and recording them on said record element, and means producing a linear relative movement between said record element and said recording means, said recording means being fixed against transverse movement relative to said linear relative movement to provide a record solely in the direction of said relative movement.

11. Apparatus for recording as a function of time on a record member a signal in the form of an elongated constant width record composed of areas of varying length in the direction of said elongation corresponding to pulses of a pulse width modulated carrier comprising an source of pulse width modulated signals, means providing an insulated surface, means receiving said signals and producing on said surface a latent electrostatic image corresponding to said signals, and means producing a linear relative movement between the last-mentioned means and said insulated surface, said image producing means being fixed against transverse movement relative to said linear realtive movement to provide a linear record solely in the direction of said relative movement.

12. Apparatus as claimed in claim 11 including means for applying developing powder to said electrostatic image, and means for fixing the developed image.

(References on following page)

References Cited in the file of this patent

UNITED STATES PATENTS

| | | |
|---|---|---|
| 2,197,050 | Kellogg | Apr. 16, 1940 |
| 2,434,936 | Labin et al. | Jan. 27, 1948 |
| 2,440,263 | Grieg | Apr. 27, 1948 |
| 2,465,380 | Labin et al. | Mar. 29, 1949 |
| 2,539,553 | Rich | Jan. 30, 1951 |
| 2,624,652 | Carlson | Jan. 6, 1953 |
| 2,708,615 | Greenleaf et al. | May 17, 1955 |
| 2,716,048 | Young | Aug. 23, 1955 |
| 2,726,131 | Skelton | Dec. 6, 1955 |
| 2,732,775 | Young et al. | Jan. 31, 1956 |
| 2,736,770 | McNaney | Feb. 28, 1956 |
| 2,739,865 | Willey | Mar. 27, 1956 |
| 2,767,388 | Rust | Oct. 16, 1956 |
| 2,777,745 | McNaney | Jan. 15, 1957 |
| 2,791,288 | Meier | May 7, 1957 |
| 2,800,639 | Lee | July 23, 1957 |
| 2,829,025 | Clemens | Apr. 1, 1958 |
| 2,851,676 | Woodscock et al. | Sept. 9, 1958 |
| 2,877,080 | Eisler | Mar. 10, 1959 |
| 2,907,621 | Eisler et al. | Oct. 6, 1959 |
| 2,919,170 | Epstein | Dec. 29, 1959 |

FOREIGN PATENTS

| | | |
|---|---|---|
| 1,098,368 | France | July 25, 1955 |
| 1,113,933 | France | Apr. 5, 1956 |
| 734,909 | Great Britain | Aug. 10, 1955 |
| 733,484 | Great Britain | July 13, 1955 |